(12) United States Patent
Yun et al.

(10) Patent No.: US 11,293,327 B2
(45) Date of Patent: Apr. 5, 2022

(54) SAMPLING DEVICE FOR AN EXHAUST GAS SENSOR

(71) Applicant: Faurecia Emissions Control Technologies, USA, LLC, Columbus, IN (US)

(72) Inventors: Gil-Seong Yun, Gyeonggi-do (KR); Eric Ker, Columbus, IN (US)

(73) Assignee: Faurecia Emissions Control Technologies, USA, LLC, Columbus, IN (US)

(*) Notice: Subject to any disclaimer, the term of this patent is extended or adjusted under 35 U.S.C. 154(b) by 219 days.

(21) Appl. No.: 16/666,568

(22) Filed: Oct. 29, 2019

(65) Prior Publication Data

US 2021/0123371 A1    Apr. 29, 2021

(51) Int. Cl.
| F01N 13/00 | (2010.01) |
| F01N 13/08 | (2010.01) |
| F01N 3/20 | (2006.01) |

(52) U.S. Cl.
CPC ......... *F01N 13/008* (2013.01); *F01N 3/2066* (2013.01); *F01N 13/082* (2013.01)

(58) Field of Classification Search
CPC combination set(s) only.
See application file for complete search history.

(56) References Cited

U.S. PATENT DOCUMENTS

| 5,625,156 | A   | * | 4/1997  | Serrels     | F01N 13/008 73/863.51 |
| 7,497,138 | B2  | * | 3/2009  | Kubinski    | F01N 13/008 73/114.71 |
| 8,756,913 | B2  |   | 6/2014  | Liu et al.  |                       |
| 2012/0180457 | A1 | * | 7/2012 | Liu         | F01N 3/2066 60/276    |
| 2013/0125533 | A1 | * | 5/2013 | Sullivan    | F01N 13/008 60/276    |
| 2013/0213013 | A1 |   | 8/2013 | Mitchell et al. |                    |
| 2015/0355066 | A1 | * | 12/2015 | Zhang       | F01N 13/008 73/23.31  |
| 2016/0305297 | A1 | * | 10/2016 | Wadke       | G01N 33/004           |
| 2016/0349227 | A1 | * | 12/2016 | Di Perna    | G01N 33/0037          |
| 2018/0135496 | A1 |   | 5/2018 | Yi et al.   |                       |

FOREIGN PATENT DOCUMENTS

EP    3431731 A1    1/2019

* cited by examiner

*Primary Examiner* — Binh Q Tran
(74) *Attorney, Agent, or Firm* — Carlson, Gaskey & Olds, P.C.

(57) ABSTRACT

An exhaust system includes an exhaust duct having an internal surface defining an exhaust gas passage extending along an axis, at least one sensor opening in the exhaust duct that is configured to receive an exhaust gas sensor, and a sensor housing positioned within the exhaust gas passage. The sensor housing has a wall that extends at least partially around the at least one sensor opening. The wall has an inner wall surface defining an internal volume and includes at least one outlet opening. At least one tube is in fluid communication with the internal volume and extends from a first end, which is open to an inlet of the internal volume, to a second end that is distal from the first end. The at least one tube includes a plurality of inlet apertures.

20 Claims, 1 Drawing Sheet

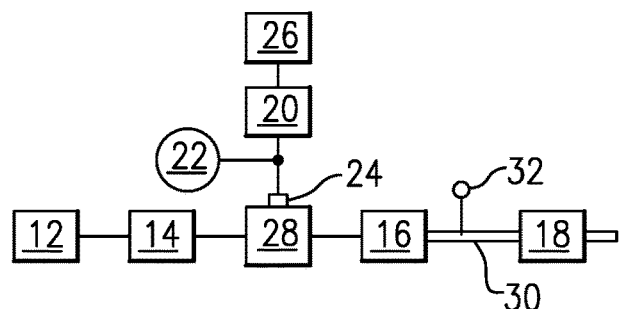
FIG.1
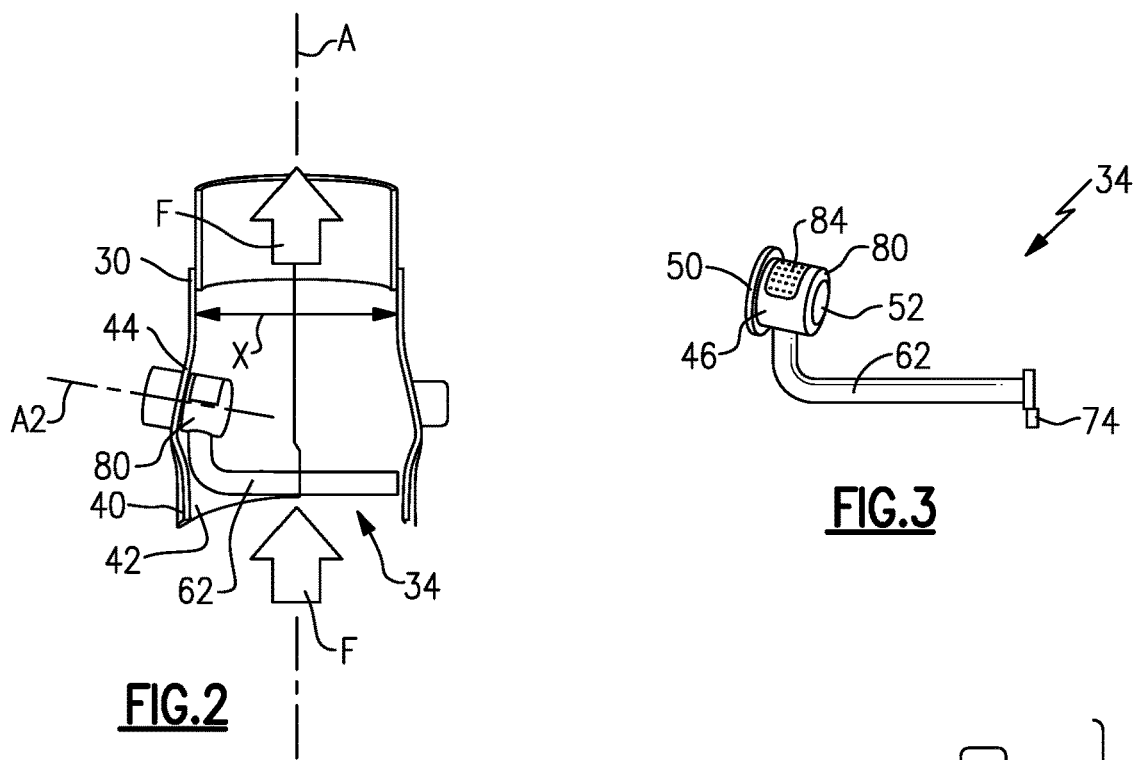
FIG.2
FIG.3
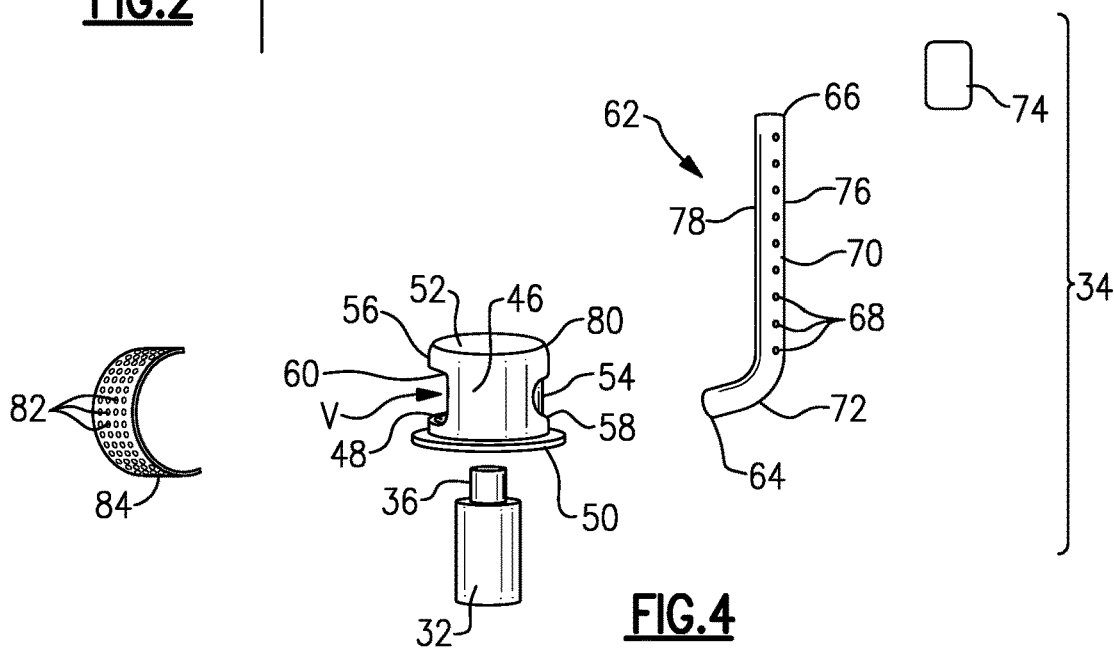
FIG.4

SAMPLING DEVICE FOR AN EXHAUST GAS SENSOR

TECHNICAL FIELD

This disclosure relates generally to a sampling device for an exhaust gas sensor located within an exhaust duct.

BACKGROUND

Vehicles include exhaust systems that utilize catalysts to remove contaminants from engine exhaust gases. One example of such a catalyst is a Selective Catalytic Reduction (SCR) catalyst where nitrogen oxide (NOx) reduction reactions take place in an oxidizing atmosphere. Levels of NOx are reduced using ammonia as a reductant within a catalyst system. A reduction chemical reaction occurs when a reducing agent reacts with NOx to convert the pollutants into nitrogen, water, and small amounts of CO2. A NOx sensor is used to measure residual NOx content of the exhaust gas exiting the SCR catalyst.

SUMMARY

An exhaust system according to an exemplary aspect of the present disclosure includes, among other things, an exhaust duct having an internal surface defining an exhaust gas passage extending along an axis, at least one sensor opening in the exhaust duct that is configured to receive an exhaust gas sensor, and a sensor housing positioned within the exhaust gas passage. The sensor housing has a wall that extends at least partially around the at least one sensor opening. The wall has an inner wall surface defining an internal volume and includes at least one outlet opening. At least one tube is in fluid communication with the internal volume and extends from a first end, which is open to an inlet of the internal volume, to a second end that is distal from the first end. The at least one tube includes a plurality of inlet apertures.

In a further non-limiting embodiment of the foregoing system, the exhaust duct has a cross-section extending across the axis, and wherein the at least one tube extends across the cross-section to receive exhaust gas from different regions of the cross-section via the plurality of inlet apertures and direct the exhaust gas toward the inlet to the internal volume.

In a further non-limiting embodiment of any of the foregoing systems, the sensor housing defines a central housing axis that is obliquely orientated relative to the axis of the exhaust gas passage.

In a further non-limiting embodiment of any of the foregoing systems, the at least one tube comprises only one tube.

In a further non-limiting embodiment of any of the foregoing systems, the at least one tube includes a straight portion and a curved portion, and wherein the curved portion curves from the first end at the inlet to the internal volume and the straight portion extends across the exhaust gas passage to the second end located adjacent to the internal surface of the exhaust duct opposite from the at least one sensor opening.

In a further non-limiting embodiment of any of the foregoing systems, the wall includes an upstream side and a downstream side, and wherein the inlet to the internal volume comprises an inlet opening in the upstream side that is connected to the first end of the at least one tube to direct exhaust flow into the internal volume, and wherein the at least one outlet opening is in the downstream side to direct exhaust flow out of the internal volume.

In a further non-limiting embodiment of any of the foregoing systems, the sensor housing comprises a cup-shaped structure with an open first end that is open to the at least one sensor opening and an enclosed second end, and wherein the wall extends circumferentially around the at least one sensor opening from the open first end to the enclosed second end.

In a further non-limiting embodiment of any of the foregoing systems, the at least one sensor comprises a NOx sensor.

An exhaust system, according to yet another exemplary aspect of the present disclosure includes, among other things, an exhaust duct having an internal surface defining an exhaust gas passage extending along an axis, and which includes at least one sensor opening. A sensor is mounted within the sensor opening and extends to a sensor tip that is within the exhaust gas passage. A sensor housing is positioned within the exhaust gas passage and has a wall that extends at least partially around the at least one sensor opening. The wall has an inner wall surface defining an internal volume and includes at least one outlet opening. A single tube is in fluid communication with the internal volume and extends from a first end, which is open to an inlet of the internal volume, to a second end that is distal from the first end. The single tube includes a plurality of inlet apertures.

In a further non-limiting embodiment of any of the foregoing systems, the single tube includes a straight portion and a curved portion, and wherein the curved portion curves from the first end at the inlet to the internal volume and the straight portion extends across the exhaust gas passage to the second end that is connected to the internal surface of the exhaust duct with a bracket, and wherein the plurality of inlet apertures are spaced apart from each other along a length of the straight portion.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a schematic view of a vehicle exhaust system.

FIG. 2 is a side view of a sampling device in an exhaust duct as used in the system of FIG. 1.

FIG. 3 is a perspective view of the sampling device of FIG. 2.

FIG. 4 is an exploded view of the sampling device of FIG. 3.

DETAILED DESCRIPTION

This disclosure details an exemplary sampling device that directs exhaust gas toward a sensor tip located within an exhaust duct. FIG. 1 shows a vehicle exhaust system 10 that conducts hot exhaust gases generated by an engine 12 through various upstream exhaust components 14 to reduce emission and control noise as known. In one example configuration, the upstream exhaust component 14 can comprise a diesel oxidation catalyst (DOC) and/or a diesel particulate filter (DPF) that is used to remove contaminants from the exhaust gas as known. Downstream of these upstream exhaust components 14 is one or more additional exhaust gas aftertreatment components 16 that also remove contaminants from the exhaust gas as known. Exhaust gases exiting the exhaust gas aftertreatment components 16 are conducted to downstream exhaust components 18 such as resonators, mufflers, etc., and eventually exit to atmosphere. These upstream 14 and downstream 18 components can be mounted in various different configurations and combinations dependent upon vehicle application and available packaging space.

In one example configuration, an injection system 20 is used to inject a reducing agent, such as a solution of urea and water for example, into the exhaust gas stream upstream from the exhaust gas aftertreatment components 16. The injection system 20 includes a fluid supply 22, a doser/injector 24, and a controller 26 that controls injection of the urea as known. An optional mixer 28 can also be positioned upstream of the exhaust gas aftertreatment components 16 such that the mixer 28 can mix the injected reducing agent and exhaust gas thoroughly together prior to entering the exhaust gas aftertreatment components 16.

In one example configuration, the exhaust gas aftertreatment component 16 comprises at least one Selective Catalytic Reduction (SCR) catalyst where the reducing agent reacts with NOx to convert the pollutants into nitrogen, water, and small amounts of CO2. Exhaust gas exiting the SCR catalyst enters an exhaust pipe or duct 30 and an exhaust gas sensor 32, e.g. a NOx sensor, is used to measure residual NOx content of the exhaust gas exiting the SCR catalyst. The structure and operation of the NOx sensor 32 are known, and any type of NOx sensor can be used to measure the residual NOx content of the exhaust gas.

As shown in FIGS. 2-4, a sampling device 34 is used to direct exhaust gas flow F toward a sensor tip 36 located within the exhaust duct 30. As shown in FIG. 2, the exhaust duct 30 defines an exhaust gas passage 38 extending along an axis A and having a cross-section X extending across the axis A. The exhaust duct 30 has an external surface 40 and an internal surface 42 that defines the exhaust gas passage 38. The exhaust duct 30 has at least one sensor opening 44 that extends through a wall thickness of the exhaust duct 30 from the external surface 40 to the internal surface 42.

The NOx sensor 32 is mounted within the sensor opening 44 and extends to the sensor tip 36 that is positioned within the exhaust gas passage 38. A sensor housing 80 is positioned within the exhaust gas passage 38 and has a wall 46 that extends at least partially around the sensor opening 44 and the sensor tip 36. In one example, the wall 46 extends completely around the sensor opening 44 and the sensor tip 36. The wall 46 has an inner wall surface 48 defining an internal volume V.

In one example, the sensor housing 80 comprises a cup-shaped structure with an open first end 50 that is open to the sensor opening 44 and an enclosed second end 52. The wall 46 extends circumferentially around the sensor opening 44 from the open first end 50 to the enclosed second end 52. The wall 46 includes an upstream side 54 and a downstream side 56. The sensor housing 80 has an inlet to the internal volume V that comprises an inlet opening 58 in the upstream side 54 of the wall 46. The sensor housing 80 has an outlet from the internal volume V that comprises at least one outlet opening 60, which is in the downstream side 56 of the wall 46, and that directs exhaust flow out of the internal volume V.

In one example, the sensor housing 80 defines a central housing axis A2 that is obliquely orientated relative to the axis A of the exhaust gas passage 38.

At least one tube 62 is in fluid communication with the internal volume V and extends from a first end 64 to a second end 66. The first end 64 is connected to the inlet opening 58 of the sensor housing 80 and is therefore open to the inlet into the internal volume V. The second end 66 of the tube 62 is distal from the first end 64 and is positioned adjacent to the internal surface 42 of the exhaust duct 30 that is located opposite from the sensor opening 44. The tube 62 includes a plurality of inlet apertures 68. The exhaust duct 30 has a cross-section X extending across the axis A, and in one example, the tube 62 extends across the cross-section X to receive exhaust gas from different regions of the cross-section X via the plurality of inlet apertures 68. The tube 62 then directs the exhaust gas toward the inlet to the internal volume V.

In one example, the tube 62 comprises the only tube 62 that feeds exhaust gas into the internal volume V. Thus, the tube 62 comprises a single tube that directs exhaust gas from across the cross-section X toward the sensor tip 36 in the internal volume V.

In one example, the tube 62 includes a straight portion 70 and a curved portion 72. The curved portion 72 curves from the first end 64 of the tube 62 at the inlet opening 58 to the internal volume V and transitions into the straight portion 70, which extends across the exhaust gas passage 38 to the second end 66 located at the internal surface 42 of the exhaust duct 30. In one example, the second end 66 of the tube 62 is connected to the internal surface 42 of the exhaust duct 30 with a bracket 74. The plurality of inlet apertures 68 are axially spaced apart from each other along a length of the straight portion 70. The curved portion 72 is substantially formed at the first end 64 such that a majority of the tube 62 comprises the straight portion 70, which extends across the cross-section X of the exhaust gas passage 38. This allows the plurality of inlet apertures 68 to be exposed to multiple different areas of the exhaust gas flow path. The straight portion 70 can extend across the exhaust gas passage 38 such that the straight portion 70 is perpendicular to the axis A, or is at a non-perpendicular angle to the axis A.

The tube 62 has an upstream surface 76 and a downstream surface 78. In one example, the plurality of inlet apertures 68 are formed in the upstream surface 76, while the downstream surface 78 is free from openings or apertures. Thus, the downstream surface 78 is a solid surface such that exhaust gas entering the inlet apertures 68 is directed toward the sensor tip 36 within the internal volume V.

As discussed above, the wall 46 has the inlet opening 58 in the upstream side 54 and the outlet opening 60 in the downstream side 56. The inlet opening 58 is connected to the first end 62 of the tube 62 to direct exhaust flow into the internal volume V, and the outlet opening 60 directs exhaust flow out of the internal volume V. In one example, the outlet opening 60 comprises a plurality of outlet apertures 82. In one example, a housing cover 84 is placed over the outlet opening 60 and is attached to the sensor housing 80. The housing cover 84 includes the plurality of outlet apertures 82.

In one example, the sampling device 34 is made from a stamping; however, other methods can also be used to form the device.

The sampling device 34 extends a tube 62 across the exhaust gas passage 38 to guide exhaust gas from different regions of the exhaust gas passage 38 into the internal volume V and toward the sensor tip 36. This improves exhaust gas sampling accuracy, as the sensor 32 is measuring residual NOx content that is representative of all of the exhaust gas in the exhaust gas stream and not just the exhaust gas that is close to the sensor tip 36. The sampling device 34 is easy to manufacture and install, and is more cost efficient compared to prior designs. Further, the sampling device 34 can be easily installed within existing systems without major changes. While the sampling device is shown as being used with a NOx sensor, it should be understood that it could be used with other types of exhaust gas sensors.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An exhaust system comprising:
   an exhaust duct having an internal surface defining an exhaust gas passage extending along an axis;
   at least one sensor opening in the exhaust duct that is configured to receive an exhaust gas sensor;
   a sensor housing positioned within the exhaust gas passage and having a wall that extends at least partially around the at least one sensor opening, the wall having an inner wall surface defining an internal volume, and wherein the wall includes at least one outlet opening;
   at least one tube in fluid communication with the internal volume, wherein the at least one tube extends from a first end, which is open to an inlet of the internal volume, to a second end that is distal from the first end, and wherein the at least one tube includes a plurality of inlet aperture; and
   wherein the wall includes an upstream side and a downstream side opposite from the upstream side, and wherein the inlet to the internal volume comprises an inlet opening in the upstream side that is connected to the first end of the at least one tube to direct exhaust flow into the internal volume, and wherein the at least one outlet opening is in the downstream side to direct exhaust flow out of the internal volume.

2. The exhaust system according to claim 1, wherein the exhaust duct has a cross-section extending across the axis, and wherein the at least one tube extends across the cross-section to receive exhaust gas from different regions of the cross-section via the plurality of inlet apertures and direct the exhaust gas toward the inlet to the internal volume.

3. The exhaust system according to claim 1, wherein the sensor housing defines a central housing axis that is obliquely orientated relative to the axis of the exhaust gas passage.

4. The exhaust system according to claim 1, wherein the at least one tube comprises only one tube.

5. The exhaust system according to claim 1, wherein the at least one tube includes a straight portion and a curved portion, and wherein the curved portion curves from the first end at the inlet to the internal volume and the straight portion extends across the exhaust gas passage to the second end located adjacent to the internal surface of the exhaust duct opposite from the at least one sensor opening.

6. The exhaust system according to claim 5, wherein the plurality of inlet apertures are spaced apart from each other along a length of the straight portion.

7. The exhaust system according to claim 5, wherein the second end of the at least one tube is connected to the internal surface of the exhaust duct with a bracket.

8. The exhaust system according to claim 1, wherein the wall extends completely around the at least one sensor opening.

9. The exhaust system according to claim 1, wherein the at least one outlet opening comprises a plurality of outlet openings.

10. The exhaust system according to claim 1, including a cover that is attached to the sensor housing over the at least one outlet opening, and wherein the cover includes a plurality of outlet apertures.

11. The exhaust system according to claim 1, wherein the sensor housing comprises a cup-shaped structure with an open first end that is open to the at least one sensor opening and an enclosed second end, and wherein the wall extends circumferentially around the at least one sensor opening from the open first end to the enclosed second end.

12. The exhaust system according to claim 1, wherein the at least one sensor comprises a NOx sensor.

13. An exhaust system comprising:
   an exhaust duct having an internal surface defining an exhaust gas passage extending along an axis, and wherein the exhaust duct includes at least one sensor opening;
   a sensor mounted within the sensor opening and extending to a sensor tip that is within the exhaust gas passage;
   a sensor housing positioned within the exhaust gas passage and having a wall that extends at least partially around the at least one sensor opening, the wall having an inner wall surface defining an internal volume, and wherein the wall includes at least one outlet opening;
   wherein the sensor housing defines a central housing axis that is obliquely orientated relative to the axis of the exhaust gas passage; and
   a single tube in fluid communication with the internal volume, wherein the single tube extends from a first end, which is open to an inlet of the internal volume, to a second end that is distal from the first end, and wherein the single tube includes a plurality of inlet apertures.

14. An exhaust system comprising:
   an exhaust duct having an internal surface defining an exhaust gas passage extending along an axis, and wherein the exhaust duct includes at least one sensor opening;
   a sensor mounted within the sensor opening and extending to a sensor tip that is within the exhaust gas passage;
   a sensor housing positioned within the exhaust gas passage and having a wall that extends at least partially around the at least one sensor opening, the wall having an inner wall surface defining an internal volume, and wherein the wall includes at least one outlet opening;

a single tube in fluid communication with the internal volume, wherein the single tube extends from a first end, which is open to an inlet of the internal volume, to a second end that is distal from the first end, and wherein the single tube includes a plurality of inlet apertures; and wherein the wall includes an upstream side and a downstream side, and wherein the inlet to the internal volume comprises an inlet opening in the upstream side that is connected to the first end of the single tube to direct exhaust flow into the internal volume, and wherein the at least one outlet opening is in the downstream side to direct exhaust flow out of the internal volume.

15. The exhaust system according to claim 14, wherein the sensor housing comprises a cup-shaped structure with an open first end that is open to the at least one sensor opening and an enclosed second end, and wherein the wall extends circumferentially around the at least one sensor opening from the open first end to the enclosed second end.

16. The exhaust system according to claim 15, wherein the at least one outlet opening comprises a plurality of outlet openings.

17. The exhaust system according to claim 15, including a cover that is attached to the sensor housing over the at least one outlet opening, and wherein the cover includes a plurality of outlet apertures.

18. The exhaust system according to claim 15, wherein the single tube includes a straight portion and a curved portion, and wherein the curved portion curves from the first end at the inlet to the internal volume and the straight portion extends across the exhaust gas passage to the second end that is connected to the internal surface of the exhaust duct with a bracket, and wherein the plurality of inlet apertures are spaced apart from each other along a length of the straight portion.

19. The exhaust system according to claim 14, wherein the single tube has a curved portion that is positioned within the exhaust gas passage, and wherein the curved portion curves from the first end of the single tube at the inlet to the internal volume on an upstream side of the wall and transitions into a straight portion that terminates at the second end.

20. The exhaust system according to claim 19, wherein the plurality of inlet apertures are formed in an upstream surface of the straight portion, while a remaining surface portion of the straight portion is free from openings or apertures.

* * * * *